(12) United States Patent
Tumlinson et al.

(10) Patent No.: US 7,721,476 B2
(45) Date of Patent: May 25, 2010

(54) BREAKAWAY SIGN SUPPORT SYSTEM

(75) Inventors: Jeff Tumlinson, Fort Worth, TX (US);
Foy Barrett, Grand Prairie, TX (US)

(73) Assignee: Centerline Supply, Ltd., Grand Prairie, TX (US)

( * ) Notice: Subject to any disclaimer, the term of this patent is extended or adjusted under 35 U.S.C. 154(b) by 0 days.

(21) Appl. No.: 12/008,817

(22) Filed: Jan. 14, 2008

(65) Prior Publication Data

US 2008/0178505 A1     Jul. 31, 2008

Related U.S. Application Data

(60) Provisional application No. 60/880,645, filed on Jan. 16, 2007.

(51) Int. Cl.
*G09F 7/04*      (2006.01)
(52) U.S. Cl. .................. 40/607.05; 52/848; 52/849; 256/65.14; 403/335; 403/312

(58) Field of Classification Search ............. 40/607.01, 40/607.04, 607.05; 256/65.14; 403/2, 312, 403/335–337; 248/530, 539, 540, 218.4; 52/848, 849, 837, 89

See application file for complete search history.

(56) References Cited

U.S. PATENT DOCUMENTS

| 3,787,015 A * | 1/1974 | Ablett .................. 248/539 |
| 3,820,966 A * | 6/1974 | Katt ..................... 51/309 |
| 4,245,922 A * | 1/1981 | Auriemma .............. 404/10 |
| 4,926,592 A * | 5/1990 | Nehls ................... 52/98 |
| 5,481,835 A * | 1/1996 | Bloom .................. 52/98 |
| 5,782,040 A * | 7/1998 | McCartan .............. 52/98 |
| 5,988,598 A * | 11/1999 | Sicking et al. ......... 256/13.1 |
| 6,626,410 B2 * | 9/2003 | Marcotte et al. ....... 248/548 |

* cited by examiner

*Primary Examiner*—Lesley Morris
*Assistant Examiner*—Shin Kim
(74) *Attorney, Agent, or Firm*—Jackson Walker L.L.P.

(57) ABSTRACT

A breakaway sign support system that is useful for supporting ground mounted signs located within zones that are vulnerable to vehicular impacts. A bracket assembly containing a combination of mounting plates and reinforcement plates bolted together is used to attach a sign post to a sign stub. The sign support system can be fabricated in the field without having to send measurements to a fabricator. The bracket assembly keeps the sign post stable but also allows for a clean break away upon impact.

5 Claims, 5 Drawing Sheets

BREAKAWAY SIGN SUPPORT SYSTEM

This application claims priority to U.S. Provisional Patent Application Ser. No. 60/880,645, entitled "BREAKAWAY SIGN SUPPORT SYSTEM," filed on Jan. 16, 2007, the entire content of which is hereby incorporated by reference.

BACKGROUND

This invention pertains to a breakaway support system for signs, and particularly to an omni-directional breakaway system for supporting ground mounted signs located within zones that are vulnerable to vehicular impacts.

Accident research and field experience have demonstrated that vehicles often leave the roadway and impact structures at high angles of incident. Breakaway sign posts have proven to be highly effective in reducing vehicle damage and occupant injury resulting from collision with highway marker signs. A variety of breakaway sign post constructions intended to meet safety requirements for highway installations have been used before for installation of highway traffic signs.

Conventional breakaway systems are typically used between a relatively short section of base post that is set in a concrete base in the ground, and a longer section of sign post that extends upwardly above the ground from the base post and supports the sign. When a car collides with the sign post, the section of the sign post above the ground is typically sheared off or hinged over to allow the car to continue on its path with minimum damage to the vehicle and without injury to its occupants. Laws and regulations typically require that the base post extend no more than a few inches above the ground following a collision to avoid damage to fuel lines or penetration of the vehicle passenger compartment as the vehicle passes over the broken-off posts.

It is important that a predictable and reliable breakaway attachment be provided between the post sections to insure that the sign post will break without imparting excessive force to the car or causing injury to its occupants, and to insure that the stub height of the base post does not cause damage to the vehicle as the vehicle passes over the base post following a collision. It is also important that such sign posts be capable of withstanding ambient wind loads normally encountered by highway sign installations. What is further needed is a breakaway attachment that provides for a predictable and omni-directional break regardless of the direction or angle of impact.

SUMMARY

The present invention relates generally to support systems for signs In particular, the present invention relates to a breakaway support system for ground mounted signs located within roadside clear zones or other locations vulnerable to vehicular impacts.

The support system is designed to break away quickly and cleanly upon impact, thus saving lives and reducing property damage costs. The support system can also be fabricated in the field, eliminating the need to take measurements to a fabricator. A user can verify the length needed, cut the post, attach the brackets, and mount to the ground stub, all in the field. This will save a great deal of time and money. The support system works with a standard fiberglass I-beam or steel I-beam and will retrofit to any existing I-beam stub in the ground.

In addition to superior safety performance, the support system provides high structural load carrying capacity. New national signing standards specify increased sign sizes for visibility, in addition to increased wind load levels. These changes create a significant increase in structural demands on sign supports. The support system is designed to support a wide range of post sizes, up to and including the largest permitted by American Association of State Highway Transportation Officials ("AASHTO"). The flexibility built into the system provides many choices when selecting post types and sizes for specific applications.

DETAILED DESCRIPTION OF PREFERRED EMBODIMENTS

Generally, the present invention relates to a breakaway sign support system which will break away cleanly upon impact and is ideal for areas vulnerable to vehicular impact.

The support system can be configured in a variety of ways to support different sign configurations and post types. The high-strength coupling and L-bracket design provides increasing structural capacity as the size of the post increases. This unique feature offers unmatched load-carrying capacity, and accommodates many different post types for both single and multiple post configurations.

For example, and without limitation, the support system can be used in association with 4 inch and 5 inch standard I-beam posts, as well as 6 inch, 8 inch, and 10 inch up to 21 inch wide flange I-beam posts. The I-beam posts can be made of fiberglass or steel. The support system can also be retrofitted to any existing I-beam stub that is already in the ground.

Due to the unique design of the support system, users can fabricate the system in the field without having to take measurements to a fabricator. After verifying the length in the field, the user can cut the post, attach the brackets, and mount the system to the stub. This saves time and money by eliminating the need to use an off-site fabricator.

No special tools or equipment are required to properly install and maintain the support system. All components are easily secured using the American Institute of Steel Construction ("AISC") Turn-of-Nut Tightening method, which eliminates the torque requirement typical with other systems.

Figure 1:
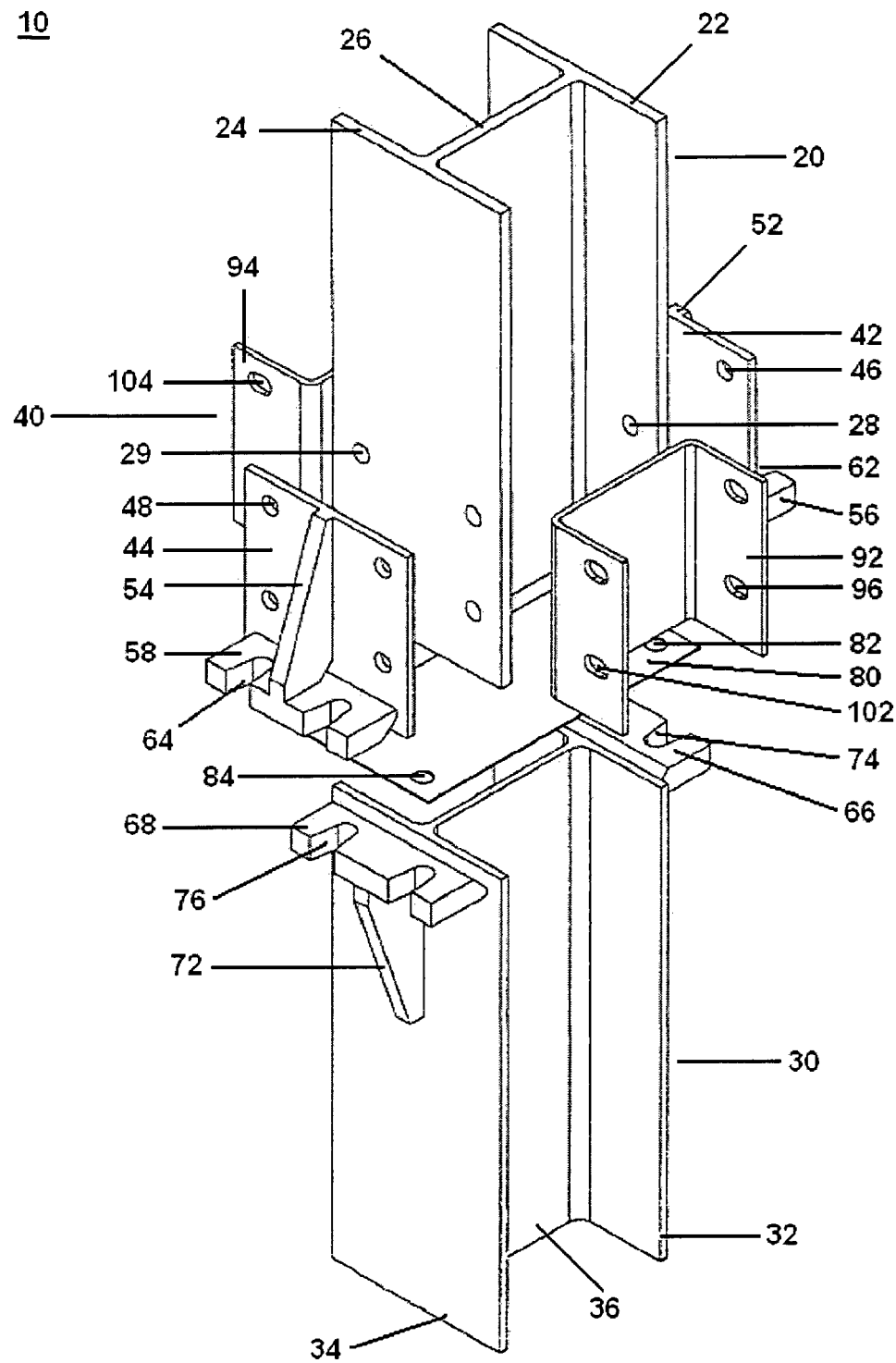
FIG. 1 shows a side perspective view of one embodiment of the support system and the bracket assembly that has not been assembled.

Referring now to FIG. 1, one embodiment of the breakaway sign support system 10 is shown. The support system 10 utilizes a sign post 20 and a sign stub 30. In this embodiment, both the sign post 20 and the sign stub 30 are in an I-beam configuration. The I-beam shaped sign post 20 includes a front post flange 22 and a rear post flange 24, as well as a center post structural support 26. The I-beam shaped sign stub 30 also includes a front stub flange 32, a rear stub flange 34, and a center stub structural support 36. In a preferred embodiment, the sign post 20 is made of fiberglass or steel and the sign stub 30 is made of fiberglass or steel. Attaching the sign post 20 to the sign stub 30 is the bracket assembly 40. The bracket assembly 40 does not include the sign post 20 and the sign stub 30 but does include various brackets, plates, and bolts used to connect the two.

The bracket assembly 40 preferably includes a front post mounting plate 42 and a rear post mounting plate 44. These mounting plates are in an L-bracket type shape in this embodiment. The front post mounting plate 42 is secured to the front post flange 22 through its front post mounting holes 46, and the rear post mounting plate 44 is secured to the rear post flange 24 through its rear post mounting holes 48. The front post mounting holes 46 match up with front post holes 28 and the rear post mounting holes match up with rear post holes 29. These holes can accommodate standard bolts that can be secured with washers and nuts. Other attachment devices can also be used. In preferred embodiments, the front post mounting plate 42 also includes a front post stiffener plate 52, and the rear post mounting plate 44 also includes a rear post stiffener plate 54. The post stiffener plates act as a gusset or a support to add to the structural integrity of the bracket assembly 40.

The front post mounting plate 42 also preferably includes a front post mounting cleat 56, and the rear post mounting plate 44 includes a rear post mounting cleat 58. These mounting cleats contain front post connecting slots 62 and rear post connecting slots 64, which can accommodate standard bolts, nuts, and washers for connection of the sign post 20 to the sign stub 30. Sign stub 30 also includes a front stub mounting cleat 66 disposed on the front stub flange 32 and a rear stub mounting cleat 68 disposed on the rear stub flange 34. In preferred embodiments, these stub mounting cleats can be further supported with stub stiffener plates, such as the rear stub stiffener plate 72. The stub mounting cleats also contain connecting slots, the front stub connecting slots 74 and the rear stub connecting slots 76.

Disposed between the sign post 20 and the sign stub 30 is the bolt keeper plate 80. The bolt keeper plate 80 has front bolt keeper holes 82 and rear bolt keeper holes 84. When the bracket assembly 40 is assembled, a standard bolt can pass though a front post connecting slot 62, a front bolt keeper hole 82, and a front stub connecting slot 74 to hold the entire assembly together. Similarly, a bolt can pass through a rear post connecting slot 64, a rear bolt keeper hold 84, and a rear stub connecting slot 76.

For added stability, the bracket assembly 40 can also include a right side reinforcement plate 92 and a left side reinforcement plate 94 that can, in this embodiment, fit within the U-shaped void spaces on either side of the sign post. The right side reinforcement plate 92 has right side front reinforcement holes 96 that line up with the front post mounting holes 46 and the front post holes 28 on the right side of the sign post 20. Thus, a standard bolt can pass through a front post mounting hole 46, a front post hole 26, and a right side front reinforcement hole 96 to ensure that the front post mounting plate 42 and the right side enforcement plate 92 are fastened to the sign post 20 and to each other to add stability. Similarly, a standard bolt can pass through a rear post mounting hole 48, a rear post hole 29, and a left side reinforcement hole 104 to attach the rear post mounting plate 44 and the left side reinforcement plate 94 to the sign post 20 and to each other. The right side rear reinforcement holes 102 also engage the rear post mounting holes 48.

Figure 2:
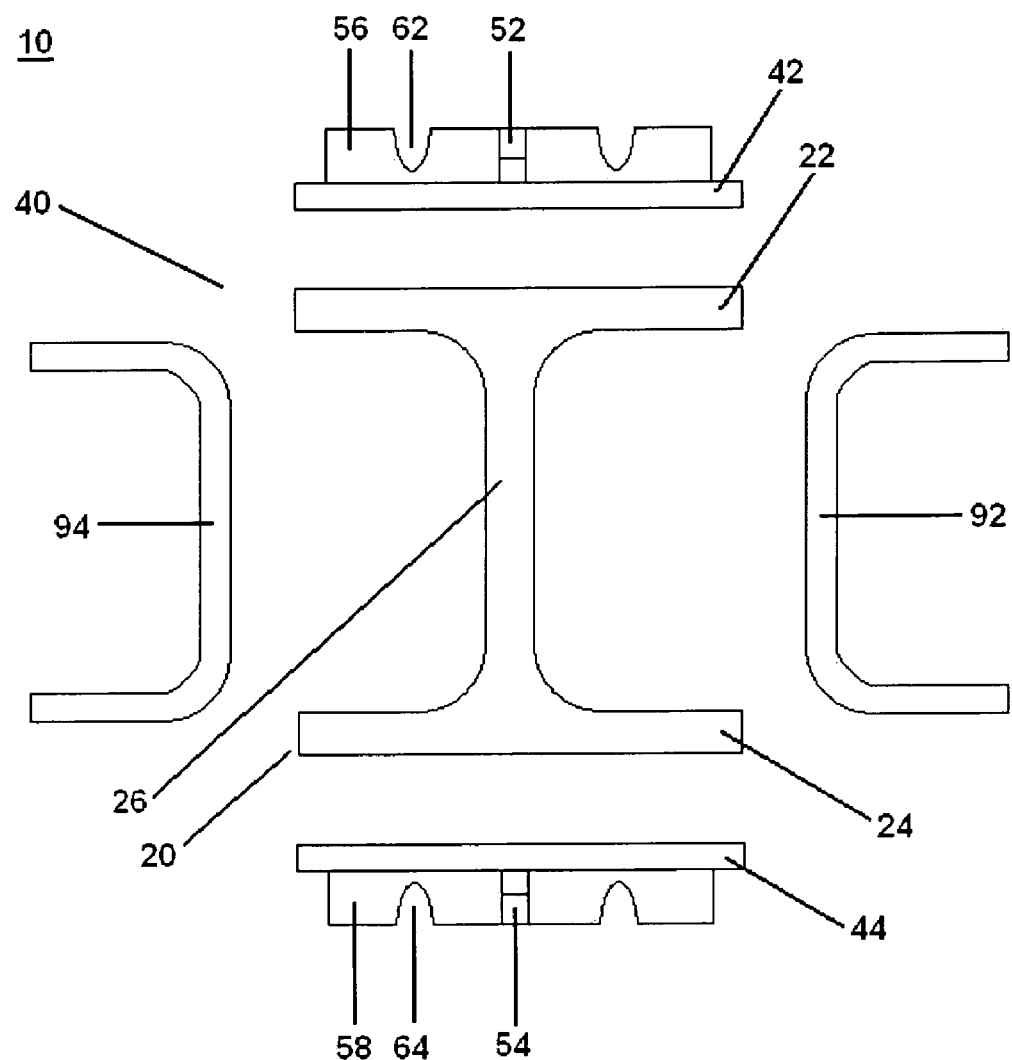
FIG. 2 shows a top view of one embodiment of the support system and the bracket assembly that has not been assembled.

Referring now to FIG. 2, a top view of one embodiment of the support system 10 and the bracket assembly 40 is shown. The sign post 20 is located in the center. When the support system 10 is assembled, front post mounting plate 42 will be attached to front post flange 22. Front post mounting plate 42 also includes a front post mounting cleat 56 having front post connecting slots 62. A front post stiffener plate 52 is also attached to the front post mounting plate 42 for added stability. To the left of the sign post 20 is a left side reinforcement plate 94, and to the right side of the sign post 20 is a right side reinforcement plate 92. These reinforcement plates also add stability to the bracket assembly 40 when all of the bolts are attached. Adjacent to the rear post flange 24 is the rear post mounting plate 44 having a rear post mounting cleat 58 with rear post connecting slots 64. The rear post mounting plate 44 will be attached to the rear flange 44 when the bracket assembly 40 is assembled. The rear post mounting plate 44 also has a rear post stiffener plate 54 for added stability.

Figure 3:
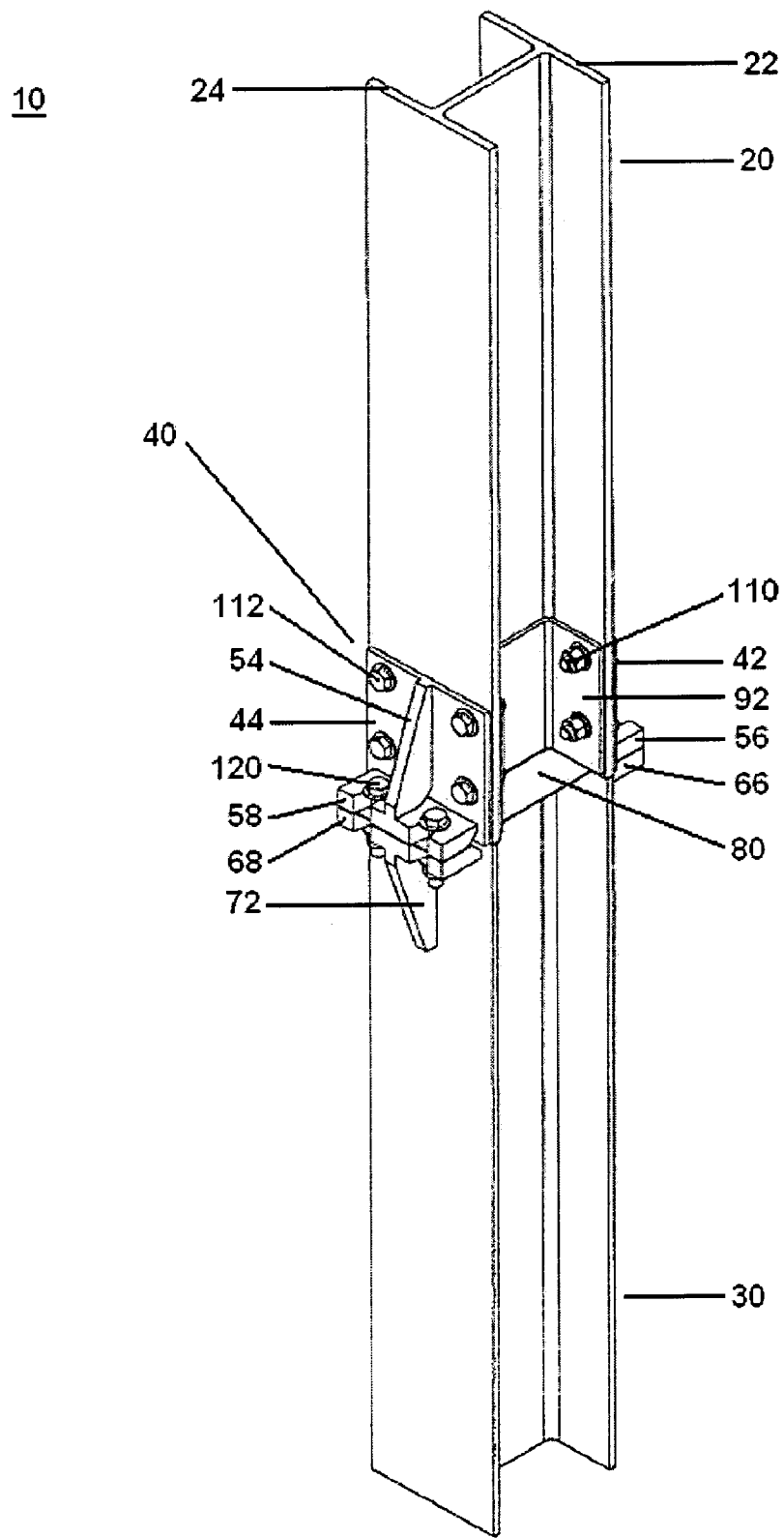
FIG. 3 shows a side perspective view of one embodiment of the support system and the bracket assembly that has been assembled.

FIG. 3 shows a side, angled view of one embodiment of the support system 10 in which the bracket assembly 40 has been assembled to connect the sign post 20 to the sign stub 30. Rear post mounting plate 44 has been attached to rear post flange 24 and both side reinforcement plates with rear post bolts 112. Right side reinforcement plate 92 is also attached to front post flange 22 and front post mounting plate 42 with front post bolts 110. Rear post connecting bolts 120 pass through the rear post mounting cleat 58, the bolt keeper plate 80, and rear stub mounting cleat 68. Although not shown in FIG. 3, front post connecting bolts also pass through the front post mounting cleat 56, the bolt keeper plate 80, and the front stub mounting cleat 66. Rear post stiffener plate 54 and rear stub stiffener plate 72 provide added stability. Also, in preferred embodiments, any bolts, plates, or brackets attached as part of the support system can be welded to the post or stub for added stability.

Figure 4:
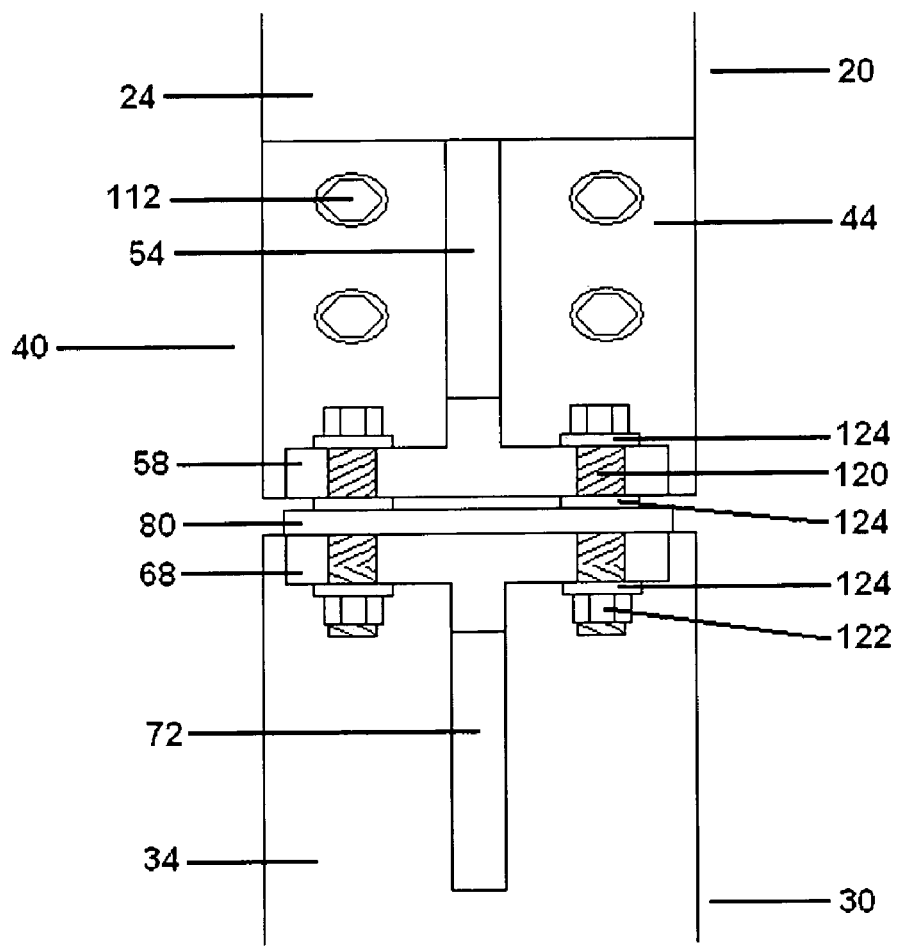
FIG. 4 shows a side view of one embodiment of the support system and the bracket assembly that has been assembled and mounted to a ground stub.

FIG. 4 shows a direct rear view of one embodiment of the support system 10 in which the bracket assembly 40 has been assembled to connect the sign post 20 to the sign stub 30. The rear post mounting plate 44 is attached to the rear post flange 24 with rear post bolts 112. A rear post stiffener plate 54 runs between the rear post mounting cleat 58 and the rear post mounting plate 44 and provides stability. A rear stub stiffener plate runs between the rear stub mounting cleat 68 and the rear stub flange 34 and provides stability. The sign post 20 is attached to the sign stub 30 by connecting bolts, illustrated in FIG. 4 as rear post connecting bolts 120. The rear post connecting bolts 120 pass through a flat washer 124, the rear post mounting cleat 58, another flat washer 124, the bolt keeper plate 80, the rear stub mounting cleat 68, another flat washer 124, and a connecting nut 122.

Figure 5:
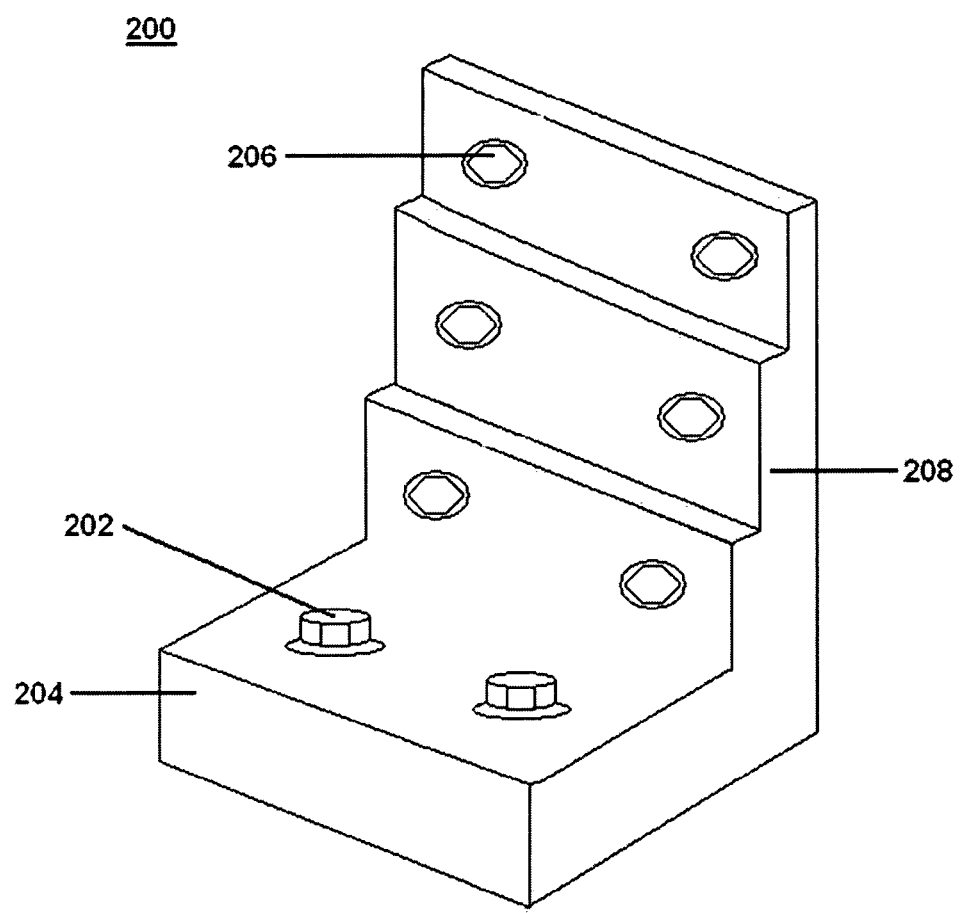
FIG. 5 shows a side perspective view of one embodiment of a mounting plate that is part of the bracket assembly.

Further embodiments of the support system can include various modifications to the bracket assembly, the sign post, and the sign stub. For example, the connecting slots located in the mounting cleats on both the sign post and the sign stub can be holes rather than slots. FIG. 5 shows an alternate embodiment for one of the mounting plates 200. In this embodiment, the connecting bolts 202 are not visible as they pass through the mounting cleat 204. In addition, particularly if the sign post is very large, several post bolts 206 can be located on the post mounting plates 200. The portion of the mounting plate 200 that is meant to contact the sign post can also have a series of step-like levels of increasing thickness 208 to add stability.

What is claimed is:

1. A sign support system having breakaway capabilities, comprising:
    a sign post in the shape of an I-beam having front, rear, right, and left sides, wherein the right and left sides comprise U-shaped voids having inner peripheries;
    a sign stub in the shape of an I-beam having front and rear sides; and
    a bracket assembly connecting the sign post to the sign stub at a lower region of the sign post and an upper region of the sign stub, wherein the bracket assembly comprises:
- post mounting plates attached to the front and rear sides of the lower portion of the sign post, wherein the post mounting plates have post mounting cleats located on a lower region of the post mounting plates,
- post mounting bolts passing through the post mounting plates and the sign post,
- stub mounting cleats located on the front and rear sides of the upper region of the sign stub,
- a bolt keeper plate located between the sign post and the sign stub and perpendicular to the sizes of the sign post and the sign stub, wherein portions of the bolt keeper plate are located between the post mounting cleats and the stub mounting cleats, and
- connecting bolts, wherein each individual connecting bolt passes through a post mounting cleat, a stub mounting cleat, and the portions of the bolt keeper plate located between the post mounting cleat and the stub mounting cleat, and wherein the connecting bolts are parallel to the sign post and sign stub.

2. The sign support system of claim 1, further comprising post stiffener plates located on the post mounting plates.

3. The sign support system of claim 1, further comprising stub stiffener plates located on the upper portion of the sign stub and immediately beneath the stub mounting cleats.

4. The sign support system of claim 1, further comprising reinforcement plates attached to the left and right sides of the lower portion of the sign post, wherein the reinforcement plates have a U-shape configured to contact the inner peripheries of the U-shaped voids of the left and right sides of the sign post, wherein portions of the sign post are located between the post mounting plates and the reinforcement plates, and wherein the post mounting bolts pass through the post mounting plates, the reinforcement plates, and the portions of the sign post located between the post mounting plates and the reinforcement plates.

5. The sign support system of claim 1, wherein the sign post is made of fiberglass and the sign stub is made of steel.

* * * * *